(12) United States Patent
Wagner-Stürz

(10) Patent No.: US 12,435,814 B2
(45) Date of Patent: Oct. 7, 2025

(54) SPRING FRACTURE DETECTION IN A PRELOADED ACTUATOR OF A CONTROL VALVE

(71) Applicant: SAMSON AKTIENGESELLSCHAFT, Frankfurt am Main (DE)

(72) Inventor: David Wagner-Stürz, Mühltal (DE)

(73) Assignee: Samson Aktiengesellschaft, Frankfurt (DE)

( * ) Notice: Subject to any disclaimer, the term of this patent is extended or adjusted under 35 U.S.C. 154(b) by 373 days.

(21) Appl. No.: 18/040,400

(22) PCT Filed: Jul. 27, 2021

(86) PCT No.: PCT/EP2021/070961
§ 371 (c)(1),
(2) Date: Feb. 2, 2023

(87) PCT Pub. No.: WO2022/028947
PCT Pub. Date: Feb. 10, 2022

(65) Prior Publication Data
US 2023/0279966 A1    Sep. 7, 2023

(30) Foreign Application Priority Data
Aug. 5, 2020   (DE) .......................... 102020120696.8

(51) Int. Cl.
*F16K 37/00* (2006.01)
*F16K 31/126* (2006.01)

(52) U.S. Cl.
CPC ...... *F16K 37/0083* (2013.01); *F16K 31/1262* (2013.01); *F16K 37/0041* (2013.01)

(58) Field of Classification Search
CPC ............ F16K 37/0083; F16K 31/1262; F16K 37/0041; F16K 37/0025; F16K 31/1221
See application file for complete search history.

(56) References Cited

U.S. PATENT DOCUMENTS

| 4,976,144 A | 12/1990 | Fitzgerald |
| 2012/0112759 A1 | 5/2012 | Kn et al. |
| 2022/0260177 A1* | 8/2022 | Weilandt ................ G06N 3/045 |

FOREIGN PATENT DOCUMENTS

| DE | 6930665 U | 2/1975 |
| DE | 29612346 U1 | 8/1997 |

(Continued)

OTHER PUBLICATIONS

Ralph Herbrich: Stellventile, Oldenburg Industrieverlag, 2004, ISBN-13: 978-3486630558, Kap. 3.5 "Ventildiagnose" with English Abstract.

(Continued)

*Primary Examiner* — Peter J Macchiarolo
*Assistant Examiner* — Timothy P Graves
(74) *Attorney, Agent, or Firm* — Merchant & Gould P.C.

(57) ABSTRACT

The invention relates to a method for detecting a spring breakage in a preloaded drive of a control valve. The method is based on the fact that the pressure which must be applied to achieve a certain valve member position falls significantly after the breakage or failure of the spring. The breakage of a spring in a preloaded drive can thus be detected reliably using the sensor system already present in the control valve, moreover without having to disrupt or interrupt operation.

7 Claims, 6 Drawing Sheets

(56) References Cited

FOREIGN PATENT DOCUMENTS

Figure 1:
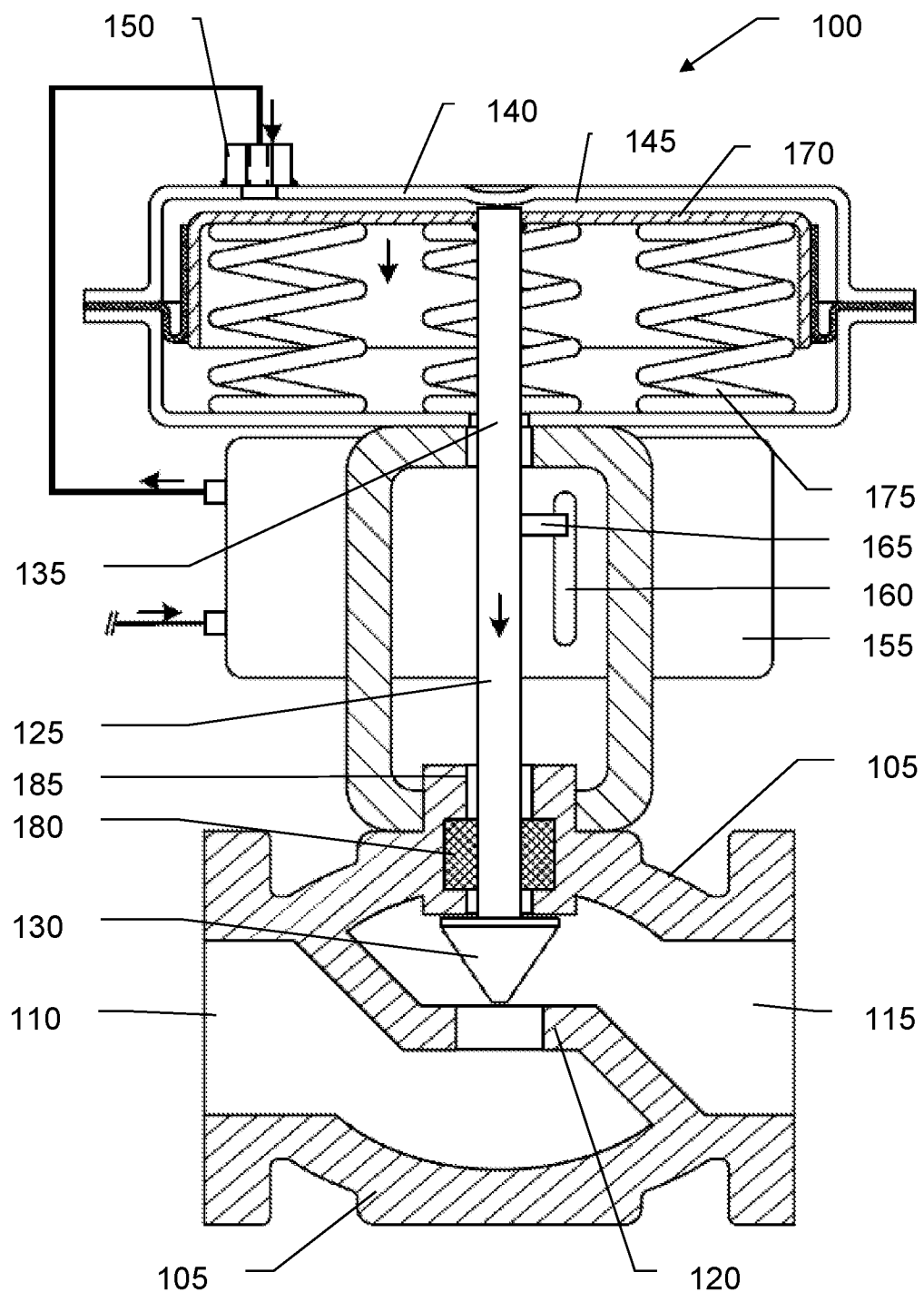

| | | |
|---|---|---|
| DE | 102015225999 A1 | 6/2017 |
| WO | 2004/074947 A2 | 9/2004 |
| WO | 2009/111101 A1 | 9/2009 |

OTHER PUBLICATIONS

International Search Report for PCT/EP2021/070961 (Nov. 17, 2021).

* cited by examiner

SPRING FRACTURE DETECTION IN A PRELOADED ACTUATOR OF A CONTROL VALVE

CROSS-REFERENCE TO RELATED APPLICATION(S)

This application is a National Stage Application of PCT/EP2021/070961, filed 27 Jul. 2021, which claims benefit of German Application Nos. 10 2020 120 696.8, filed 5 Aug. 2020, and which applications are incorporated herein by reference. To the extent appropriate, a claim of priority is made to each of the above disclosed applications.

FIELD OF THE INVENTION

The invention relates to a method for detecting the fracture of a spring in a preloaded actuator of a control valve. Control valves can be designed as rotary or globe valves. They are frequently used in process or process engineering systems for controlling or regulating a process or process medium. Other examples of applications are solar thermal systems or local and district heating systems. In addition to control and regulation applications, control valves are also used as safety valves to protect systems or processes.

Control valves usually have a drive or actuator and a movable valve member for controlling or regulating the process or process medium. The actuator acts on an actuator stem of the valve member. It is usually located outside a fluid-tight valve housing. The actuator stem of the valve member is accordingly guided through the fluid-tight housing, whereby a seal (e.g. packing) seals the actuator stem to the outside of the housing.

Friction losses often occur between the actuator stem and the seal. Other friction losses occur e.g. due to deposits, abrasion or corrosion or due to further seals in the actuator. Incorrect installation of the components of the control valve or the control valve itself can also lead to friction losses and undesirable loads on the components of the control valve.

Fluidic actuators are typically used to move the actuator stem. In many cases, pneumatic actuators are used, in which a chamber is pressurized or depressurized with compressed air to move the actuator stem.

In the area of safety-relevant fittings or safety valves, pneumatic actuators are often used that are preloaded on one side by spring forces. The compressed air always acts against the spring force with which the actuator was preloaded. Preloaded actuators move independently into a safe position or fail-safe position due to the effect of the spring forces when the actuator is depressurized, i.e. the compressed air escapes from the chamber of the actuator. This happens, for example, when a current/pressure (I/P) transducer or a solenoid valve is no longer energised.

With safety valves, the valve is often open during normal operation, and in the event of a fault (e.g. power failure) the valve closes automatically. If the actuator is now depressurized, the valve starts to close as soon as the spring forces have torn the valve member loose against the static friction that may be present. The fail-safe position can, of course, also be open without power (actuator depressurized) and closed with power applied (actuator pressurized).

The position or stroke of the valve member is usually indicated with reference to the closed position. If the position or the stroke of the valve member is indicated as 0, the valve member is in the closed position. If the position or the stroke of the valve member is indicated with 100%, the valve member is in the position opposite to the closed position. This position corresponds to a fully open valve.

In many cases, the spring forces are exerted by one or more springs in a spring packet. The springs are often designed as spiral springs made of metal (especially steel) and arranged in parallel so that the spring constants or the spring forces of the individual springs add up. Air springs or elastic (gel) cushions can also be used for pre-loading.

A fracture or damage of a spring of a preloaded actuator can lead to a failure of the safety valve or at least to an increased reaction time. In many safety-critical applications, however, this is unacceptable and is tantamount to valve failure. In addition, this may result in uneven loads on the actuator or valve member, reducing the thrust of the actuator and limiting the operating range of the valve. A reduced seat load and associated leakage in the closed position can also be a consequence. In addition, wear of the unevenly loaded components increases. The fracture or damage of a spring therefore announces an imminent failure of other springs or components of the control valve in many cases.

Generally, fracture or damage to a spring can be due to a number of factors such as corrosion or fatigue of the spring. Structural failures of other components of the actuator or control valve, as well as faulty installation, can also cause a spring to fracture or fail.

The spring does not necessarily have to break into two or more parts when it fractures.

The spring can also be plastically deformed or bent. Welded seams where the spring is fixed can fracture and cause the spring to slip or tilt. In the case of air or gel springs, the membranes can fracture or burst. A spring is therefore generally said to be broken if the spring constant of the spring changes in such a way that the spring loses its function or effect or makes no or only a greatly reduced contribution to the pre-loading of the actuator.

PRIOR ART

In the prior art, various methods can already be found to detect the fracture of a spring in a preloaded actuator of a control valve. In the patent specification U.S. Pat. No. 4,976,144 A, for example, a bench set diagnosis method is proposed. For this purpose, the valve member is moved during a test operation and a stroke-pressure curve is recorded when the actuator is pressurized and when the actuator is depressurized. The two curves are not the same due to friction losses. They define a range called the valve signature. The slope of the stroke-pressure curves is a measure of the spring constant of the spring packet. Failure of a spring is detected by a change in the slope or slopes.

In a similar way, DE 10 2015 225 999 A1 records the temporal course of an operating parameter during opening and closing, which allows conclusions to be drawn about the force required for opening or closing. The fracture of a spring is detected by a change in the force required to open or close the valve.

In order to avoid a test operation for the detection of a spring fracture, it is proposed in the application publication WO 2004/074947 A1 to calculate the spring constant on the basis of stroke-pressure curves which are recorded during operation. For this purpose, the valve member is moved a small distance and then returned to the starting position. The fracture of a spring is again detected by means of the slope of the stroke-pressure curves recorded during this process.

The utility model specification DE 296 12 346 U1 discloses an alternative approach. In this method, the valve member is also moved testwise. However, the spring constant is not determined by the slope of the associated stroke-pressure curves, but by the elapsed time. If a spring fractures, less compressed air must be supplied to or removed from the actuator to move the valve member. Accordingly, the reaction time of the actuator element is shortened, which is used to detect the fracture or failure of a spring.

In the disclosure WO 2009/111101 A1, the slope of stroke-pressure curves and the reaction time of the valve member to a given stroke change are also used to determine a change in the spring constant in order to detect the fracture or failure of a spring (see also chapter 3.5 "Valve diagnostics" of the book "Stellventile" by Ralph Herbrich).

The known methods are based on detecting changes in the slope of stroke-pressure curves or the reaction time of the valve member. The valve member must be moved in a certain stroke range, whereby the corresponding stroke delta must exceed a certain range in order to be able to reliably calculate a slope or a reaction time. This is not always possible, especially with static processes, or may lead to undesirable interferences of the process. Furthermore, it takes a certain amount of time after a spring fracture until it is detected. In many cases, however, this may be too late. Furthermore, if the process or process medium conditions change during the method, this is directly reflected in the analysis, so that a spring fracture is not detected or is falsely detected. Dents or irregularities in the stroke-pressure characteristic curve, which can be caused, for example, by worn seals or packings, can also lead to misinterpretations and be falsely attributed to a spring fracture.

Problem

The object of the invention is to provide a method by which the fracture of a spring in a preloaded actuator of a control valve can be detected more reliably and more easily, and without having to disturb or interrupt the ongoing operation.

Solution

This problem is solved by the subject matter of the independent claims. Advantageous further embodiments of the subject matter of the independent claims are indicated in the dependent claims. The wording of all claims is hereby incorporated in this description by reference.

The use of the singular form is not intended to exclude the plural form, which shall also apply in the reverse sense, unless otherwise disclosed.

Individual method steps are described in more detail below. The steps need not necessarily be carried out in the order given, and the method to be described may also include further, unmentioned steps.

To solve the problem, a method is proposed for detecting a fracture of a spring in a preloaded actuator of a control valve, the control valve being intended to be part of a plant on which a process with a process medium is running. The control valve comprises a valve member for affecting the process medium and/or the process running on the plant,
a pneumatic actuator arranged to position the valve member to affect the process medium and/or the process, the pneumatic actuator comprising the spring preloading the actuator,
a position sensor for measuring the actual position of the valve member, and
a pressure sensor for measuring the actual pressure in the pneumatic actuator.

The method comprises the following steps:
1. Determining or specifying a valve signature, the valve signature enabling each actual position of the valve member to be associated with a range of pressures that can be achieved when operating the control valve with an undamaged spring.
2. Measuring the actual position of the valve member using the position sensor at a point in time.
3. Measuring the actual pressure in the pneumatic actuator using the pressure sensor at the time.
4. Determining whether the spring is broken, wherein a fracture of the spring is determined by the measured actual pressure being less than each of the pressures that can be associated with the measured actual position of the valve member using the valve signature and/or the measured actual position being greater than each of the positions that can be associated with the measured actual pressure of the valve member using the valve signature.
5. Issuing a message if a fracture of the spring is detected.

The fracture or failure of the spring is in many operating situations almost instantaneous, i.e. the preload force of the failing spring is reduced within a period of time that is very short in relation to the typical time scales of valve control and/or the achievement of force equilibrium. Because of the direct line of action between the spring, the drive or actuator and the valve member, there is also an almost instantaneous change in the behaviour of the drive or actuator and the valve member. The pressure that has to be applied to reach a certain valve member position after the fracture or failure of the spring decreases significantly and sustainably. The proposed method uses the systematically too low pressures to detect the fracture or failure of a spring with the sensor technology available for controlling the position of the valve member, and does so without having to interrupt the ongoing operation or disrupt it with additional measures.

Immediately after the fracture or failure of a spring, there is usually no equilibrium between the forces acting on the valve member. This includes the force exerted on the valve member by the compressed air in the pneumatic actuator as well as the spring forces that move the valve member to the fail-safe position when the actuator is depressurized. In such non-equilibrium situations, the correlation between the actual position of the valve member and the actual pressure of the pneumatic actuator depends on a variety of factors that do not play a role in an equilibrium situation. However, these factors can only be recorded with great difficulty or not completely. Therefore, methods based on determining the spring constants using the actual position of the valve member and the actual pressure of the pneumatic actuator (or a quantity directly related to this, such as the reaction time to move the valve member from a first to a second position) cannot be used, or the fracture or failure of a spring can only be detected with these methods when equilibrium of the forces has been established again. This may be too late. The proposed method can detect a spring fracture already in non-equilibrium situations and thus much earlier and more reliably than is possible with the methods described in the prior art.

The method is based on measuring an actual position of the valve member and an actual pressure of the pneumatic actuator at a given time. Further measurements at other or different times are not necessary. Delays and/or interferences caused by further measurements, e.g. by changes in the process or process medium conditions, can be reduced or even avoided in this way.

The control valve may include a positioner that controls the position of the valve member using the pneumatic actuator and the position sensor. The positioner can be set up to implement the proposed method during normal control operation in the form of an additional diagnostic function. It may also be arranged to generate data descriptive of the fracture or failure when the fracture or failure of a spring is detected. This data may be stored in the positioner or transmitted to a plant control room. In other embodiments, this data may be further processed into a diagnostic display by a suitable display device of the positioner and/or the control valve and/or the control room.

The valve signature can be determined or specified using an input mask on the positioner, the control valve or a control room. This can be done by explicitly specifying the pressure ranges associated with the valve member positions and/or by a calibration cycle that determines the pressure ranges by measurement. The corresponding data can be stored in a memory and retrieved to carry out the method. The calibration cycle can be started e.g. before or during installation of the positioner or the control valve.

In this way, the valve signature used can be individually adapted to the specific installation situation of the control valve and the springs used for preloading. In addition, tolerances can be added to the valve signature which can be adapted to the application at hand in order to avoid false alarms.

The valve signature can also be updated at regular intervals. The update can take place during operation or as part of a maintenance cycle. In this way, wear and contamination of the valve, the valve member, the actuator, in particular the seals, can be included in the proposed method. The method can thus be designed more reliably.

From the valve signature, a fracture signature can be derived that allows each actual position of the valve member to be assigned a range of pressures that can be reached in the event of a fracture of the spring. The fracture of the spring can be determined by the fact that the measured actual pressure corresponds to one of the pressures that can be assigned to the measured actual position of the valve member with the help of the fracture signature.

In simple cases, the fracture signature includes pressures less than each of the pressures that can be associated with an actual position of the valve member using the valve signature and are positive.

The fracture signature can also be calculated by multiplying the valve signature by a factor that simulates the fracture or failure of the spring. For example, if the actuator is preloaded with n springs that are the same or at least comparable, the valve signature can be multiplied by the factor $(n-1)/n$ Possible overlapping areas with the valve signature can be subtracted from the fracture signature. In addition, the fracture signature—as well as the valve signature—can be provided with tolerances in order to avoid false alarms.

The fracture signature can also be calculated on the basis of average values. For each actual position of the valve member, for example, an average value P of the pressures can be formed, which can be assigned to the actual position of the valve member with the help of the valve signature. The corresponding pressure range of a fracture signature can then be specified, for example, by the following interval:

$[((n-1)/n)P(1-\delta)-\epsilon, ((n-1)/n)P(1+\delta)+\epsilon]$, where $\delta$ represents a proportional and $\epsilon$ a constant width of the signature. In this way, measurement errors, which are e.g. proportional to the measured pressure, as well as friction losses, which often provide a constant contribution to a valve signature, can be modelled and included in the procedure. Further correction factors can also be added to the fracture signature to account for perturbations to the valve member, actuator or sensors. P can represent the arithmetic mean of the pressures or be calculated by weighting the pressures differently.

By specifying a fracture signature, the reliability of the method can be increased and further adapted to the application at hand. If the preload of the actuator includes springs that are different or act at different points of the actuator, the fracture signature can be specified individually for each spring. The sum of the fracture signatures can comprise disjoint ranges. In this way, not only the fracture or failure of a spring can be detected, but also a statement can be made about which spring and/or in which area of the actuator a spring has broken.

The fracture signature may contain correction factors. Such factors can be used, for example, to account for changes or errors in determining the cone area, the diaphragm area of the actuator, errors in measuring the pressures or the positions of the valve member.

In many operating situations, the fracture or failure of a spring triggers a spontaneous movement of the valve member against the spring forces with which the actuator was preloaded. This movement has characteristic properties that can be used to detect the fracture or failure of a spring within the framework of the proposed method. For this purpose, the actual position of the valve member at different times and the actual pressure in the pneumatic actuator at the different times can be measured and recorded. The fracture of the spring can be determined by analysing the recorded actual positions and actual pressures to determine whether a spontaneous movement of the valve member has occurred against the spring force, the spontaneous movement being characteristic of the movement of the valve member immediately after the fracture of the spring.

In this way, the information obtained anyway when controlling the position of the valve member can be used. The reliability of the method can also be further increased.

The occurrence of the spontaneous movement of the valve member against the spring force can be determined in the method with the aid of the time elapsed during the spontaneous movement, the distance covered during the spontaneous movement, the maximum deviation from a set position occurring during the spontaneous movement, the drive being controlled in such a way that the actual position of the valve member corresponds to the set position, the velocities and/or accelerations occurring during the spontaneous movement, the area swept in a stroke-pressure diagram during the spontaneous movement and/or a predefined range of position and pressure values, the predefined range comprising movement profiles of the valve member when the spring fractures, which were obtained by measurement and/or calculation. The swept area can be formed with respect to the set position of the valve member.

The spontaneous movement is significantly influenced by the way in which the position of the valve member is controlled. In many cases, a positioner is used for this. However, the function of the positioner can also be taken over by part of the plant's control room. Another significant influence is the compressed air supply to the actuator, in particular the pressure at which the compressed air is provided.

The control counteracts the spontaneous movement of the valve member after the spring fractures or fails. Without control, the position of the valve member would shift to a larger stroke after the spring fractures. If the position sensor detects such a movement of the valve member, the actuator is usually depressurized in order to move the valve member back to the position that is specified to the control system as the set position.

The method allows to take into account the different factors and associated time scales of the movement of the valve member after the fracture or failure of the spring. It can also be adapted to the installation situation of the actuator and the valve member in the control valve and the installation situation of the control valve in the plant. Changes, e.g. due to wear or deposits, can also be taken into account.

Pattern recognition methods and/or machine learning methods can also be used to detect the spontaneous movement of the valve member after the spring fractures or fails.

If the actuator is preloaded with different springs, the method can be set up to detect which of the springs is broken or has failed. This can be achieved, for example, with the help of movement profiles for each of these springs.

When determining the fracture of the spring, the current operating situation and/or reference variables of the control valve can be taken into account. In this way, it is possible to distinguish between movements of the valve member that are specified by the control room of the plant and are changed again at short notice (e.g. due to a malfunction) or due to the current process and spontaneous movements of the valve member due to the fracture or failure of the spring. If the fracture or failure of the spring is determined with the help of a fracture signature, these factors can also be included in the fracture signature.

The control valve can have one or more sensors for measuring the process medium pressure. This allows to determine the reaction of the process medium on the valve member and the actuator and, for example, to correct the pressure values measured by the actuator pressure sensor for the medium influence. For example, with the help of two sensors, the pressure drop within the control valve and the associated force exerted by the process medium on the actuator via the valve member can be determined. In this way, fluctuations in the process medium pressure that lead to a spontaneous movement of the valve member can be detected.

The problem is also solved by a positioner which is part of a control valve with a preloaded actuator, the control valve being intended to be part of a plant on which a process with a process medium is running. The control valve has the following features:
 a valve member for affecting the process medium and/or the process running on the plant,
 a pneumatic actuator arranged to position the valve member to influence the process medium and/or the process, the pneumatic actuator comprising the spring preloading the actuator,
 a position sensor for measuring the actual position of the valve member, and
 a pressure sensor for measuring the actual pressure in the pneumatic actuator.

The positioner further comprises means suitable for carrying out the steps of a method according to the invention.

A computer program or non-transitory computer readable medium comprising instructions or a computer-readable signal which cause the positioner described above to carry out the method steps of a method according to the invention also solves the problem.

The problem is further solved by a data carrier on which the computer program or non-transitory computer readable medium just described is stored.

Further details and features result from the following description of preferred embodiments in connection with the figures. The respective features may be implemented individually or in combination with one another. The possibilities for solving the problem are not limited to the embodiments. For example, range specifications always include all—unmentioned—intermediate values and all conceivable subintervals.

Figure 2:
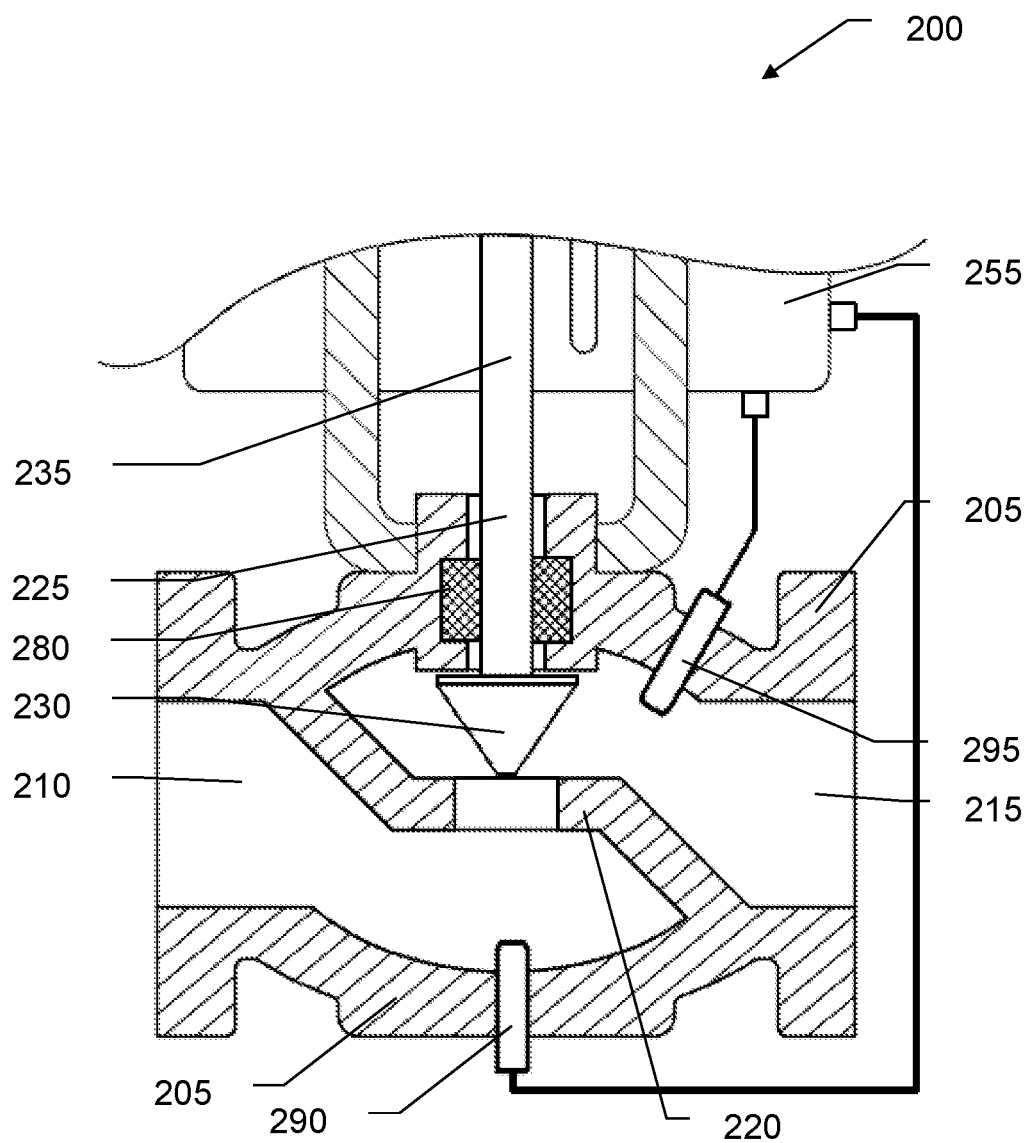
Figure 3:
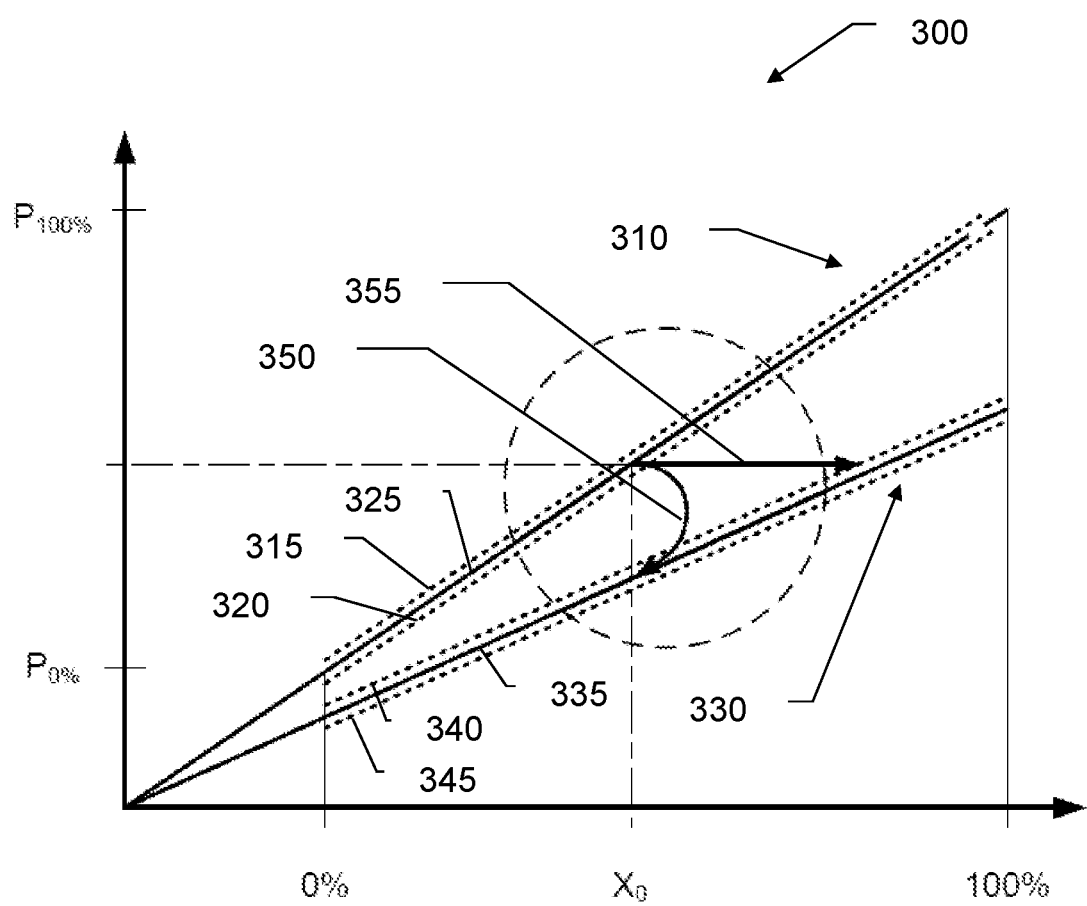
Figure 4:
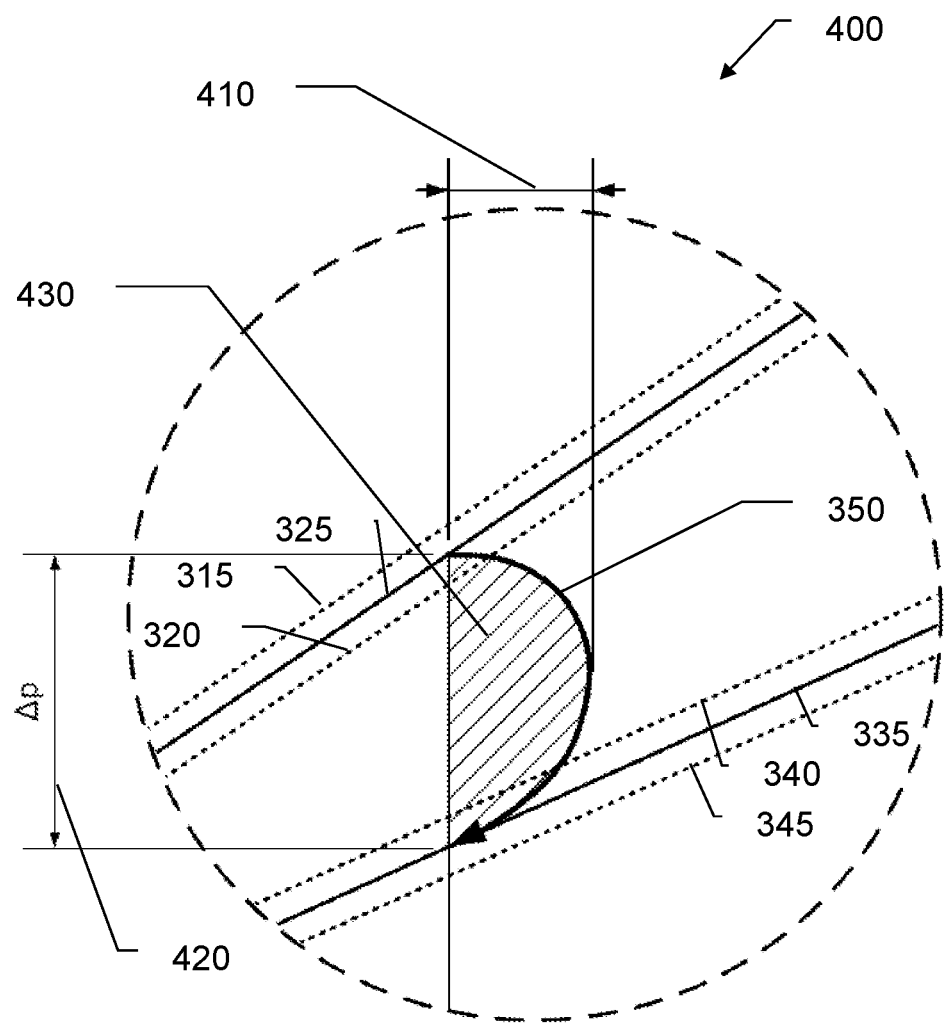
Figure 5:
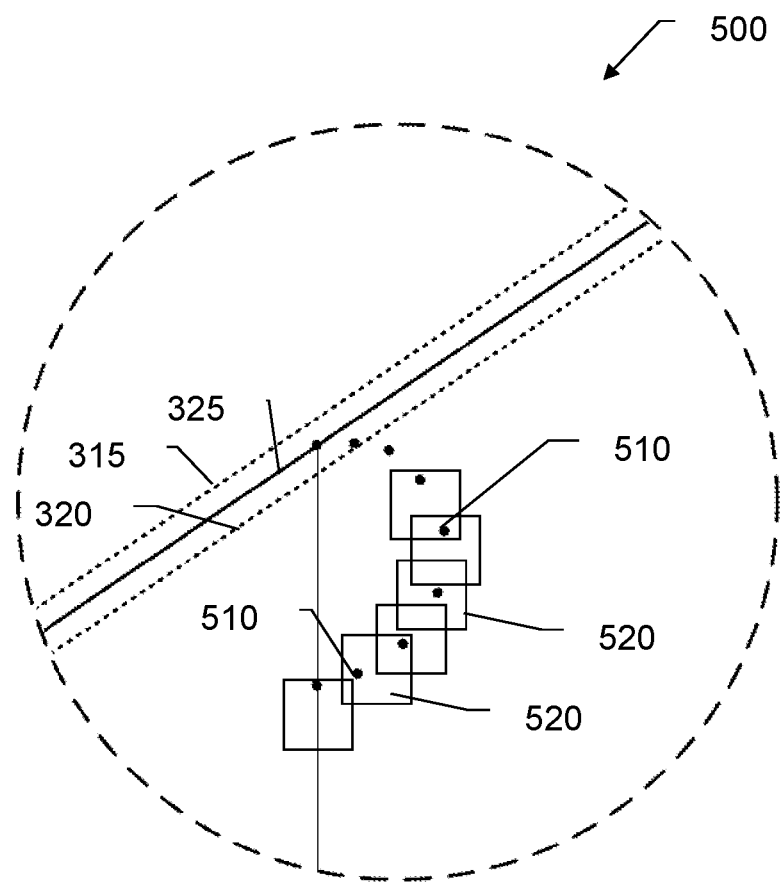
Figure 6:
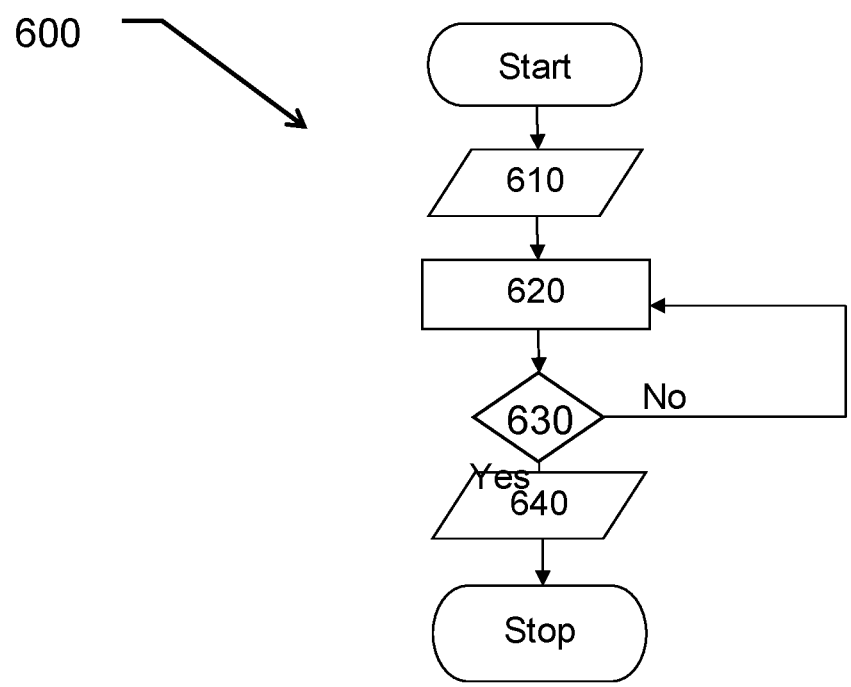

The embodiments are shown schematically in the figures. Identical reference numerals in individual figures designate identical or functionally identical elements or elements that correspond to one another in terms of their functions. In detail:

FIG. 1 a control valve with a preloaded actuator;

FIG. 2 a section of a control valve with a preloaded actuator;

FIG. 3 a stroke-pressure diagram with a trajectory;

FIG. 4 a section of the stroke-pressure diagram;

FIG. 5 a section of the stroke-pressure diagram with an alternative representation of the trajectory; and FIG. 6 a flow chart of a method according to the invention.

FIG. 1 shows an "air-to-close" control valve 100 with a valve housing 105. The valve housing 105 comprises an inlet 110, an outlet 115, a valve seat 120 and a valve member 125 with a valve cone 130. With the aid of the valve cone 130 and/or the valve member 125, the flow of a process medium through the control valve 100 can be controlled. The process medium flows into the control valve 100 via the inlet 110 and leaves the valve 100 via the passage opening formed by the valve seat 120 and the valve cone 130 and the outlet 115. The process medium can also flow through the control valve 100 in the opposite direction The valve member 125 further comprises an actuator or valve stem 135, wherein the valve cone 130 is attached to the lower end of the actuator or valve stem 135. To close the valve 100, the valve cone 130 is moved in the direction of the valve seat 120 with the aid of the valve stem 135. To open, the valve cone 130 and/or the valve member is moved in the opposite direction. In this way, the size of the passage opening of the control valve 100 formed by the valve seat 120 and the valve cone 130 can be enlarged or reduced and thus the flow rate of a fluid medium or process medium through the control valve 100 can be controlled.

The valve member 125 is guided into the valve housing 105 via an opening 185. The valve housing 105 has a packing 180 arranged in the opening 185. The packing 180 seals the valve member 125 from the valve housing 105 in a fluid-tight manner.

For the method of moving the valve member 125 and/or the valve cone 130, the control valve 100 has a pneumatic actuator 140. The pneumatic actuator has a chamber 145 which is pressurised or depressurised for moving the valve member 125. The pressure of the air in the chamber 145 is measured with a compressed air sensor 150.

The actuator 140 is controlled by a positioner 155 connected to the compressed air sensor 150, which is integrated into the actuator 140. The positioner 155 has a position sensor 160 for controlling the movement of the valve member 125 by the actuator 140. In the example shown, the position sensor 160 is a magnetic sensor that senses the position of a magnet 165. The magnet 165 is fixedly connected to the actuator stem 135. The position of the magnet 165 thus indicates the position of the valve member 125, at least within the operating range of the valve 100.

The actuator 140 is preloaded by a spring packet 170. In the schematically shown arrangement, the spring packet 170 has six helical springs 175, three of which are located in front of and three behind the sectional plane. The helical springs 175 are steel springs and are arranged in parallel, so that the spring constant of the spring packet 170 is the sum of the spring constants of the springs 175.

The proposed method is executed during operation of the valve 100 by the positioner 155. It is implemented as part of a diagnostic function that is executed in parallel with the control of the position of the valve member 125 by the positioner 155. For this purpose, the positions of the valve member 125 measured and recorded during control, as well as pressures in the chamber 145 of the pneumatic actuator 140, are recorded and analyzed. In this way, the fracture or failure of one of the springs 175 can be detected before a balance has been established between the force exerted on the valve member by the compressed air in the chamber 145 and the force exerted on the valve member 125 by the remaining or undamaged springs 175.

FIG. 2 shows a section of a control valve 200, which is almost identical in construction to the control valve 100. It also has a valve housing 205, an inlet 210, an outlet 215, a valve seat 220 and a valve member 225 for opening or closing the valve 200, the valve member 225 consisting of a valve cone 230 and a valve or actuator stem 235 and being sealed towards the valve housing 205 by a packing 280. The position of the valve member 225 is also controlled with the aid of a positioner 255, an actuator (not shown) which is controlled for this purpose by the positioner 255, and a position sensor 260. The actuator of the control valve 200 can be preloaded with three springs, for example. The control valve 200 has two further pressure sensors 290 and 295 in the valve housing 205, which are connected to the positioner 255. With the help of the pressure sensors 290 and 295, the process medium pressure can be measured before and after passing the valve seat 220, respectively.

With the aid of the sensors 290 and 295, the positioner 255 implements an embodiment of the proposed method in which the process medium pressures in the valve housing 205 are included. For this purpose, the sensor 290 is used to determine the process medium pressure P1 at the location of the sensor 290 and/or on the side of the valve seat 220 and/or valve cone 230 facing the inlet 210. Accordingly, with the help of the sensor 295, the process medium pressure P2 is determined at the location of the sensor 295 or on the side of the valve seat 220 or valve cone 230 facing the outlet 215. The pressures P1 and P2 can be used to calculate or at least estimate the forces that the process medium exerts on the valve cone 230, the valve stem 235, and the valve member 225, respectively. These forces lead, among other things, to a displacement of the valve signature. This displacement is usually dependent on the running process. It is used in the embodiment of the proposed method to correct the measured actual pressures in the pneumatic actuator of the control valve 200.

In this way, false indications due to process-dependent forces on the valve member 225, which are similar in their effect on the measured actual pressures to the forces due to a spring fracture, can be avoided. With such corrections, spontaneous movements of the valve member 225 due to process fluid fluctuations can also be detected and distinguished from spontaneous movements of the valve member 225 due to the fracture of one of the springs. In addition, the valve signature can be dynamically adapted to the operating situation of the control valve 200. The same applies to the fracture signature, which is additionally taken into account by the position controller when performing the method. In addition, the sensitivity of the method can be increased, since process-dependent shifts of the valve or fracture signature to higher pressures in the pneumatic actuator can be detected and thus actual pressures can be assigned to a spring fracture, which without correction lie within the valve signature or above the fracture signature and thus would not be assigned to a spring fracture.

For this purpose, the positioner 255 can be equipped with a correction model that uses the pressure values of the sensors 290 and 295 to calculate an approximation for the disturbance force acting back on the valve actuator from the medium. This calculation allows, for example, to suppress the verification of certain features. This would avoid inaccurate indications of a failure, but at the same time reduce the number of available features or indicators. As far as possible, an adaptation of the features, such as the valve or fracture signature, to a change in the process medium pressure or the process medium pressures should therefore be considered.

For this purpose, the forces of the process medium on the valve cone 230 or the valve member 225 can be reduced, for example, to two main contributions, which can be calculated or estimated using the area A1 of the projection of the valve cone 230 onto the plane of the valve seat 220 and the area A2, which corresponds to the difference of the area A1 and the cross-sectional area of the valve stem 235. The disturbance force exerted by the process medium on the valve cone 230, the valve stem 235 or the valve member 225 can then be calculated or estimated using the difference vector $$(P1 \cdot A1 - P2 \cdot A2) \cdot e$$

where e represents a unit vector that is parallel to the valve stem 235 and points in the direction of the actuator of the control valve 200.

FIG. 3 shows a stroke-pressure diagram 300. The stroke-pressure diagram 300 comprises the operating range of the valve 200, which extends from the open position (stroke=0%, pressure=$P_{0\%}$) to the closed position (stroke=100%, pressure=$P_{100\%}$), as well as a set position $X_0$ of the valve member 225. The positioner 255 controls the pneumatic actuator of the control valve 200 so that the actual position of the valve member 225 corresponds to the set position $X_0$. The valve member 225 moves within a valve signature 310 in the diagram 300. With the help of the valve signature 310, each actual position of the valve member 225 can be assigned a range of pressures that can be reached during operation of the control valve 200 with an undamaged spring packet. The valve signature 310 includes a pressurizing curve 315 and a depressurizing curve 320. The pressurizing curve 315 defines the highest pressure that can be associated with an actual position of the valve member 225 using the valve signature 310. The depressurizing curve 320 defines the lowest pressure that can be assigned to an actual position of the valve member 225 using the valve signature 310. The difference between the curves 315 and 320 is a measure of the friction that occurs when the valve member 225 moves, for example, along the packing 280.

FIG. 3 also shows an average value curve 325. The average value curve 325 represents the arithmetic mean of the pressurizing curve 315 and the depressurizing curve 320. The average value curve 325 was used to derive a fracture signature 330 with average value curve 335. For this purpose, curve 325 was multiplied by the factor $$(3-1)/(3)$$

to calculate the average value curve 335 of the fracture signature 330. Subsequently, the difference between the average curve 325 and the pressurizing curve 315 was added to the average curve 335 to define an upper limiting curve 340 of the fracture signature 330 towards high pressures. The difference between the average curve 325 and the depressurizing curve 315 was correspondingly subtracted from the average curve 335 to define a lower limiting curve 345 of the fracture signature 330 towards low pressures.

If, when measuring the actual position and the actual pressure, the associated pair of values lies within the fracture signature 330, i.e. between the upper limiting curve 340 and lower limiting curve 345, it can be assumed that one of the three springs of the preloaded actuator of the control valve 200 is broken.

The fracture of one of the three springs of the preloaded actuator of the control valve 200 leads to a deflection of the valve member 225, which is detected by the positioner 255. The positioner 255 then controls the pneumatic actuator of the valve 200 to move the valve member 225 back to the initial or set position $X_0$. Diagram 300 shows a trajectory 350 representing possible movement of valve member 225 after one of the three springs of control valve 200 fractures.

Furthermore, FIG. 3 shows a trajectory 355. The trajectory 355 represents the behavior of the valve member 225 without any readjustment of the positioner 255.

During operation of the control valve 200, the positioner 255 regularly checks the position of the valve member 225 and, as part of the diagnostic function, checks whether one of the measured actual pressures together with the actual position of the valve member 225 is within the fracture signature 330. If this is the case, the positioner 225 issues a message or warning to the plant control room that one of the three springs of the preloaded actuator has failed.

FIG. 3 shows by way of example that the change in the operating behavior of the drive or actuator of the control valve 200 due to the fracture of a spring can be understood simplistically as a change from a first characteristic curve bundle (valve signature 310) to a second characteristic curve bundle (fracture signature 330). In this context, each of the bundles of characteristics comprises three stroke-pressure curve characteristics (e.g., characteristics 315, 320, and 325 of valve signature 310 or characteristics 335, 340, and 345 of fracture signature 330), which together are also referred to by the literature as the signature of the actuator-valve system.

The average value curve 325 can be regarded as an ideal characteristic curve. This characteristic curve corresponds to the equilibrium of pressure force and spring force. Because of friction, the ideal characteristic curve is noticeably left in practice in some situations. For example, in uncontrolled travel from 0% to 100%, the valve member 225 effectively runs on the dashed real forward characteristic 315 running parallel above the ideal characteristic. There, the effective force acting on the spring assembly is reduced due to friction. The motion lags behind the ideal situation without friction. When moving in the opposite direction, the valve member 225 runs on the reverse characteristic 320, which is also dashed and lies below the ideal characteristic. The parallel offset of equal size between the three characteristic curves explained in the example corresponds to a simplifying assumption of constant friction. The friction may depend on direction, position and other circumstances. For example, the packing 280 may exhibit wear at certain valve position ranges and thus exert less friction on the valve member 225.

The control strategy of the positioner 255 can be set up to adjust the valve member 225 to a predetermined set position $X_0$, as shown in the exemplary sketch of FIG. 3. The operating point of the valve member 225 belonging to the set position $X_0$ can in principle lie within the strip between the forward characteristic 315 and the reverse characteristic 320 in the stroke-pressure diagram 300.

An operating point on the ideal characteristic curve is often considered preferable, especially in the case of symmetrical disturbance forces that move the valve member 225 away from the set position $X_0$. In this case, the forces required to break away from the set position would be approximately equal to the static friction force in both directions. A set position near the forward 315 or reverse 320 characteristic could be considered more robust to unilateral disturbance forces, because there the actuator preload must be overcome to break out of the set position in one direction in addition to the static friction force. The methods explained in this application are generally independent of the location of the preferred operating point.

The defect of the fracture of a spring in the spring packet of the actuator considered here can be understood as a change in its characteristic curve bundle. The previous characteristic curve bundle 310 is replaced by a characteristic curve bundle 330 lying below in diagram 300. The characteristic curve bundle 330 shows a flattened behavior due to the reduced spring constant of the spring packet. In the exemplary situation, the failure of one spring in a set of three identically configured springs was assumed. Accordingly, the slope of the ideal characteristic 335 in the characteristic bundle 330 was set to ⅔ of the slope of the ideal characteristic 325 in the characteristic bundle 310. In addition, it was assumed that the frictional forces are not affected by the failure of the spring. This may be different in practical situations. In particular, the failure of a spring could result in an off-center total force relative to the valve stem 235 with an effect on friction in its guide or packing 280.

FIG. 4 shows a section 400 of the stroke-pressure diagram 300, representing three parameters that can be used to characterize the trajectory 350 or the associated spontaneous movement of the valve member 225 against the spring force. This includes
a maximum deviation 410,
a pressure difference 420 and
a swept area 430.

The maximum deviation 410 represents the maximum difference between the set position $X_0$ and the positions that the valve member 225 takes along the trajectory 350.

The pressure difference 420 represents the difference in pressures required to position the valve member at $X_0$ (see FIG. 3) before and after the fracture of one of the three springs of the control valve 200.

The swept area 430 is the area between the trajectory 350 and a straight line from the start point to the end point of the trajectory 350.

Values for these characteristics were determined using simulations of the fracture of one of the three springs of the control valve 200 and stored in a memory unit of the positioner 255 during installation using an input mask. The values can be checked within the framework of the method performed by the positioner 255 to detect the fracture of one of the springs in the preloaded actuator of the control valve 200. If a movement of the valve member is recorded and there is a match with all or a majority of the stored values, a fracture of one of the springs can be assumed. In this case, the positioner issues an appropriate warning message. The function of the control valve 200 should then be checked and the defective spring packet repaired or replaced.

FIG. 5 shows a section 500 of the stroke-pressure diagram 300, which has the same circumference as the section 400. Individual measurement points 510 are shown. The trajectory 350 was formed with the measurement points 510. In addition, windows 520 are depicted. The windows 520 result in a position-dependent range of position and pressure values.

The range formed by the windows 520 includes possible movement profiles of the valve member in case of fracture of one of the springs. The windows—like the values for the parameters 410, 420 and 430—were determined by simulation or approximation calculation and stored in a memory unit of the positioner 255 during installation using an input mask. Within the scope of the method, which the positioner 255 executes to detect the fracture of one of the springs in the preloaded actuator of the control valve 200, it can be checked whether the recorded measurement points lie within the windows 520 during a movement of the valve member. If this is the case, this represents a strong indication that one of the springs is broken or has failed. In addition, it can be determined how many of the measurement points are within a window 520. The number of measurement points that lie within the windows 520 can also be used to detect a fracture of one of the springs and can be recorded, analyzed and stored, for example, as a histogram.

The windows 520 can also be determined by measurement. An exemplary measurement could be performed on a control valve whose spring packet has been reduced by one spring. With identically specified springs, the result does not depend significantly on the selection of the spring. The direct measurement will first reveal the upper boundary curve 340 and lower boundary curve 345 of the fracture signature 330. The ideal characteristic 335 can be approximated by taking the average value, assuming friction is independent of direction. However, knowledge of the ideal characteristic curve 335 is not required in the present exemplary situation.

FIG. 6 shows a flow chart of a preferred embodiment of a method 600 according to the invention. The method starts with step 610, in which, among other things, the method parameters such as the valve signature are specified. In step 620, the actual pressure and the actual position of the valve member at a point in time are measured. In step 630, the measured actual pressure and the measured actual position are used to decide how to continue the method. If no spring fracture was detected, the method is continued with step 620. If a spring fracture is detected on the basis of the measured values, a warning or error message is output in step 640 and the method is ended.

The method can be executed as a diagnostic function implemented, for example, in the positioner of a control valve or the control room of a plant. As long as no spring fracture has been detected and the method has been terminated, the actual pressure of the pneumatic actuator and the actual position of the valve member are determined regularly. This can be done, for example, at a fixed rate of 5 Hz, 10 Hz, 100 Hz, 200 Hz or 500 Hz. If the fracture of a spring is detected, the actuator of the control valve can be depressurized. The remaining spring forces then move the valve member to a fail-safe position. In this way, the fracture of further springs or the failure of the control valve can be prevented.

Glossary

Plant

A plant is a planned combination of technical components. The components can include machines, devices, apparatus, storage units, lines or transport routes and/or control or regulating elements. They can be functionally, control-technically and/or safety-technically connected with each other, interconnected or linked.

Plants are operated in many different areas for a variety of purposes. These include, for example, method or process engineering plants, which in many cases can be attributed to the chemical industry. The term plants also includes refineries, district heating systems, geothermal or solar thermal plants, plants for food production, fresh water supply or wastewater disposal, biogas plants, etc.

Drive and/or Actuator

A drive or actuator is a unit that converts a signal or signal sequence, e.g. from a positioner or control computer, into mechanical movements or changes in physical variables such as pressure or temperature. Drives or actuators are thus suitable for controlling or regulating, for example, a process in a process plant. The signal or signal sequence is usually transmitted electrically or by radio and can be analog or digital. A drive can be an electric or fluidic drive, whereby fluidic drives can be driven either hydraulically or with compressed air.

Input Mask

An input mask is a graphical user interface or user interface with which application software can be operated by means of graphical symbols or control elements. Among other things, it is used to feed parameters and/or data into the computing unit that executes the application software and thus make them available to the application software. Operation takes place, for example, by means of a mouse as the control device with which the graphical elements are operated or selected, and in the case of smartphones, tablets and kiosk systems usually by touching a sensor screen. Parameters can be entered via a corresponding control panel or keyboard. Data can be made available via corresponding data carriers such as CD or DVD or USB sticks. An input screen can also be implemented via a web interface. In this case, the parameters and/or data to be input can be fed in via a network connection. A positioner can have an input mask, e.g. to pre-input or input a valve signature, an (operating) parameter or another parameter. The input mask can also be used to start or invoke a calibration cycle or step to capture, record, or determine a valve signature, (operating) parameter, or other parameter.

Spring Packet

A spring packet comprises several springs which are arranged and connected to each other in such a way that the springs can interact. The springs can be arranged parallel to each other, so that the spring constant of the spring packet results from the sum of the spring constants of the individual springs. A spring packet can be made up of identical or different springs, whereby the springs differ in their spring constant, the materials used in the manufacture of the springs, their design or—in the case of helical springs—the number of coils. Spring packets can be used, for example, to preload actuators for control valves.

Spring

A spring is a technical component that can be deformed sufficiently elastically in practical use. Springs are often designed as helical springs. Helical springs represent a wire wound or coiled in the shape of a screw. They are pulled apart (tension springs) or compressed (compression springs)

in the direction of the coil axis. Other embodiments of springs involve air springs or elastic (gel) cushions.

Equilibrium

An equilibrium is a state of a body (e.g. a valve member) in which the body experiences no acceleration. It therefore remains at rest or moves at a constant speed. A body is in mechanical equilibrium when all forces acting on it are in equilibrium, i.e. the vector sum of the forces is zero.

Stroke

A stroke of a valve member refers to the distance the valve member travels when it is moved from a first position to a second position.

Actual Pressure

An actual pressure represents the pressure—for example, in a sealed chamber or at a specific (flat extended) location—at a specific point in time. The actual pressure is a measure of the force exerted by a medium on the walls of the enclosed chamber or the surface of the specific location at the specific time. In many cases, the actual pressure is equated with the currently prevailing pressure or the corresponding forces acting on the walls of a chamber or the surface of a location at the current time. However, the specific point in time can also refer to a point in time in the past or in the future.

Actual Position

An actual position represents the position and/or orientation of a body in space at a certain point in time. In many cases, the actual position of a body is equated with its momentary position, i.e. with the position that the body occupies at the present time. However, the specific point in time can also refer to a point in time in the past or in the future. An actual position is often the starting point for a targeted movement of a body towards a set position.

Nonequilibrium

A non-equilibrium is a state of a body (e.g. a valve member) in which the body experiences an acceleration. Consequently, it does not remain at rest and does not move at a constant speed. A body is in a mechanical non-equilibrium when all forces acting on it are in non-equilibrium, i.e. the vector sum of the forces is not equal to zero.

Process

A (technical) process is the complete set of operations in a (technical) plant. A running process is a process that is currently being run on a plant or in the normal operation of a plant. A process can be continuous or ongoing (petroleum refining, district heating or power generation) or discontinuous or a batch or charge process (dough production for the production of baked goods, drug production, roasting of coffee).

Process Medium

A process medium is a fluid medium that is circulated or transported within a plant as part of a process and may be changed in the process. Process media can be oils, salts, liquids or gases or mixtures thereof.

Positioner

A positioner is that element of a valve that actuates or controls the valve member of the valve to open or close the valve. In many cases, positioners include or are connected to an electric or fluid actuator.

Set Position

A set position represents a specified or desired position or orientation of a body in space, from which the actual position of the body should deviate as little as possible. A set position or target position is in many cases the target of a directed movement of a body or the end result aimed at by the directed movement of the body. Ideally, at least as a result of the directed movement of a body, the actual position of the body matches the desired set position or deviates from it only within the scope of the positioning uncertainty achievable with the directed movement or a predetermined position tolerance.

Control Valve

Control valves, also called process or regulator valves, are used to throttle or control fluid flows. For this purpose, a closing part, e.g. a perforated plug or valve cone, is moved relative to a valve seat by means of an actuator. This way, a flow opening is released or closed, whereby the flow rate can be influenced, up to a complete closure of the flow opening. Typically, a pneumatic or electric actuator is used for this purpose.

Valve Member

A valve member is that element of a valve which can release or close the valve seat and is actuated, for example, by a positioner to close or open the valve. It is usually composed of a valve stem and a valve cone, the latter being mounted at the end of the valve stem.

Valve Signature

A valve signature represents a bundle of stroke-pressure curves in a stroke-pressure diagram. Stroke-pressure curves are functions that can be used to assign a pressure (e.g. of a pneumatic actuator of a control valve) to a stroke (e.g. of a valve member). A valve signature is usually defined with the help of a pressurizing curve and a depressurizing curve. The stroke-pressure curves of a valve signature lie within the band formed by the pressurizing and the depressurizing curves. The latter do not coincide due to friction and exhibit hysteresis. The definition of a valve signature can be supplemented by specifying an average value curve.

Point in Time

A point in time is a precisely defined moment in a temporal reference system. It can be specified on a time scale and—in contrast to a time span—has no extension.

REFERENCE NUMERALS

100 Control valve
105 Valve housing
110 Inlet
115 Outlet
120 Valve seat
125 Valve member
130 Valve cone
135 Valve stem
140 Actuator
145 Chamber
150 Pressure sensor
155 Positioner
160 Position sensor
165 Magnet
170 Spring packet
175 Spring
180 Packing
185 Opening
200 Control Valve
205 Valve housing
210 Inlet
215 Outlet
220 Valve seat
225 Valve member
230 Valve cone
235 Valve stem
255 Positioner
280 Packing
290 Pressure sensor 295 Pressure sensor
300 Stroke-pressure diagram
310 Valve signature
315 Pressurizing curve
320 Depressurizing curve
325 Average value curve
330 Fracture signature
335 Average value curve
340 Upper limiting curve
345 Lower limiting curve
350 Trajectory
355 Trajectory
400 Section of the stroke-pressure diagram 300
410 maximum deviation
420 Pressure difference
430 Swept area
500 Section of the stroke-pressure diagram 300
510 Measurement point
520 Window
600 Method
610 Input
620 Measuring
630 Checking
640 Outputting a message

CITED LITERATURE

Cited Patent Literature

U.S. Pat. No. 4,976,144 A
WO 2004/074947 A1
DE 296 12 346 U1
WO 2009/111101 A1
DE 10 2015 225 999 A1

Cited Non-Patent Literature

Ralph Herbrich: Stellventile, Oldenburg Industrieverlag, 2004, ISBN-13: 978-3486630558, chapter 3.5 "Ventildiagnose"

The invention claimed is:

1. A method for detecting a fracture of a spring in a control valve;
wherein the control valve is configured to be part of a plant on which a process with a process medium is running;
wherein the control valve comprises:
a valve member for affecting the process medium and/or the process running on the plant;
a pneumatic actuator adapted to position the valve member for affecting the process medium and/or the process;
wherein the pneumatic actuator comprises the spring;
wherein the spring preloads the actuator;
a position sensor for measuring the actual position of the valve member; and
a pressure sensor for measuring the actual pressure in the pneumatic actuator;
the method comprising the steps of:
determining or specifying a valve signature;
wherein the valve signature allows each actual position of the valve member to be associated with a range of pressures that can be achieved when operating the control valve with an undamaged spring;
measuring the actual position of the valve member using the position sensor at a point in time;
measuring the actual pressure in the pneumatic actuator using the pressure sensor at said point in time;
determining whether the spring is broken, wherein a fracture of the spring is thereby determined
that the measured actual pressure is lower than any of the pressures that can be associated with the measured actual position of the valve member using the valve signature
and/or
that the measured actual position is greater than each of the positions that can be assigned to the measured actual pressure of the valve member by means of the valve signature;
outputting a message if a fracture of the spring has been determined;
wherein:
a fracture signature is derived from the valve signature;
wherein the fracture signature allows to assign to each actual position of the valve member a range of pressures that can be reached in the event of a fracture of the spring;
wherein the fracture of the spring is determined by the measured actual pressure corresponding to one of the pressures which can be assigned to the measured actual position of the valve member by means of the fracture signature.

2. The method according to claim 1,
wherein
the valve signature is determined or predetermined with the aid of an input mask.

3. The method according to claim 1,
wherein
the valve signature is updated at regular intervals.

4. The method according to claim 1, wherein the current operating situation and/or reference variables of the control valve are taken into account when determining the fracture of the spring.

5. The method according to claim 1, wherein the control valve comprises one or more sensors for measuring the process medium pressure.

6. A method for detecting a
fracture of a spring in a control valve;
wherein the control valve is configured to be part of a plant on which a process with a process medium is running;
wherein the control valve comprises:
a valve member for affecting the process medium and/or the process running on the plant;
a pneumatic actuator adapted to position the valve member for affecting the process medium and/or the process;
wherein the pneumatic actuator comprises the spring;
wherein the spring preloads the actuator;
a position sensor for measuring the actual position of the valve member; and
a pressure sensor for measuring the actual pressure in the pneumatic actuator;
the method comprising the steps of:
determining or specifying a valve signature;
wherein the valve signature allows each actual position of the valve member to be associated with a range of pressures that can be achieved when operating the control valve with an undamaged spring;
measuring the actual position of the valve member using the position sensor at a point in time;
measuring the actual pressure in the pneumatic actuator using the pressure sensor at said point in time;

determining whether the spring is broken, wherein a fracture of the spring is thereby determined that the measured actual pressure is lower than any of the pressures that can be associated with the measured actual position of the valve member using the valve signature and/or that the measured actual position is greater than each of the positions that can be assigned to the measured actual pressure of the valve member by means of the valve signature;

outputting a message if a fracture of the spring has been determined;

wherein at different times the actual position of the valve member and at the different times the actual pressure in the pneumatic actuator is measured and recorded;

wherein the fracture of the spring is determined by analyzing the recorded actual positions and actual pressures to determine whether a spontaneous movement of the valve member against the spring force has occurred;

wherein the spontaneous movement is characteristic of the movement of the valve member immediately after the fracture of the spring.

7. The method according to claim 6, wherein the occurrence of the spontaneous movement of the valve member against the spring force is determined with the aid of the time elapsed during the spontaneous movement and/or the distance covered during the spontaneous movement and/or the maximum deviation from a set position occurring during the spontaneous movement, wherein the actuator is controlled so that the actual position of the valve member corresponds to the set position, and/or the velocities and/or accelerations occurring during the spontaneous movement, and/or the area in a stroke-pressure diagram swept during the spontaneous movement and/or a predetermined range of position and pressure values, the predetermined range comprising movement profiles of the valve member when the spring fractures, wherein the movement profiles have been obtained by measurement and/or calculation, is recognized.

* * * * *